United States Patent
Malewicz

(10) Patent No.: US 10,776,400 B2
(45) Date of Patent: Sep. 15, 2020

(54) CLUSTERING USING LOCALITY-SENSITIVE HASHING WITH IMPROVED COST MODEL

(71) Applicant: Facebook, Inc., Menlo Park, CA (US)

(72) Inventor: Grzegorz Malewicz, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 737 days.

(21) Appl. No.: 15/453,754

(22) Filed: Mar. 8, 2017

(65) Prior Publication Data

US 2017/0177705 A1    Jun. 22, 2017

Related U.S. Application Data

(62) Division of application No. 14/163,555, filed on Jan. 24, 2014, now Pat. No. 9,626,426.

(51) Int. Cl.
| | |
|---|---|
| *G06F 16/28* | (2019.01) |
| *G06F 16/248* | (2019.01) |
| *G06F 16/2453* | (2019.01) |
| *G06F 16/951* | (2019.01) |
| *G06F 16/22* | (2019.01) |
| *G06F 16/35* | (2019.01) |
| *G06F 16/58* | (2019.01) |
| *G06F 16/31* | (2019.01) |

(52) U.S. Cl.
CPC ........ *G06F 16/285* (2019.01); *G06F 16/2255* (2019.01); *G06F 16/248* (2019.01); *G06F 16/24545* (2019.01); *G06F 16/951* (2019.01); *G06F 16/325* (2019.01); *G06F 16/35* (2019.01); *G06F 16/58* (2019.01)

(58) Field of Classification Search
CPC .............................. G06F 16/285; G06F 16/248
USPC ........................................................ 707/737
See application file for complete search history.

(56) References Cited

U.S. PATENT DOCUMENTS

| | | | |
|---|---|---|---|
| 9,552,408 B2 | 1/2017 | Malewicz | |
| 2003/0120429 A1* | 6/2003 | Li | G16B 40/00 702/19 |
| 2009/0318802 A1 | 12/2009 | Boyden et al. | |
| 2010/0070509 A1 | 3/2010 | Li et al. | |
| 2011/0296374 A1 | 12/2011 | Wu et al. | |
| 2011/0307426 A1* | 12/2011 | Syed | G06F 19/00 706/12 |
| 2012/0195476 A1* | 8/2012 | Bayram | G06K 9/00577 382/124 |
| 2013/0031059 A1 | 1/2013 | Ravikumar et al. | |
| 2013/0318069 A1* | 11/2013 | Alu | G06F 16/24524 707/718 |

(Continued)

OTHER PUBLICATIONS

Applicant Admitted Prior Art (Applicants Background), Paragraphs [0003-0004], pp. 2- 3, Filed Jan. 24, 2014.*

(Continued)

*Primary Examiner* — Shahid A Alam
(74) *Attorney, Agent, or Firm* — FisherBroyles, LLP

(57) ABSTRACT

Embodiments are disclosed for using an improved locality sensitive hashing (LSH) operation for the K-means clustering algorithm. In some embodiments, parameters of an LSH function are optimized with respect to a new cost model. In other embodiments, an LSH operation is applied with optimized parameters to a K-means clustering algorithm.

20 Claims, 6 Drawing Sheets

(56) References Cited

U.S. PATENT DOCUMENTS

| | | | |
|---|---|---|---|
| 2014/0086492 A1* | 3/2014 | Iwamura | G06K 9/62 382/190 |
| 2014/0112572 A1 | 4/2014 | Reif et al. | |
| 2015/0213112 A1 | 7/2015 | Malewicz | |
| 2015/0213375 A1 | 7/2015 | Malewicz | |

OTHER PUBLICATIONS

Applicant Drawing, Figure 1, 1 Page, Filed Jan. 24, 2014.*
Non-Final Office Action dated Jul. 22, 2016, for U.S. Appl. No. 14/163,751 byMalewicz, G., filed Jan. 24, 2014.
Non-Final Office Action dated Sep. 9, 2016 of U.S. Appl. No. 14/163,555 by Malewicz, G. et al., filed Jan. 24, 2014.
Notice of Allowance dated Feb. 10, 2017 of U.S. Appl. No. 14/163,555 by Malewicz, G., filed Jan. 24, 2014.
Notice of Allowance dated Oct. 5, 2016, for U.S. Appl. No. 14/163,751 by Malewicz, G., filed Jan. 24, 2014.
Restriction Requirement dated Jun. 13, 2016, for U.S. Appl. No. 14/163,555 by Malewicz, G. et al., filed Jan. 24, 2014.
U.S. Appl. No. 14/163,555 of Malewicz, G., filed Jan. 24, 2014.
U.S. Appl. No. 14/163,751 of Malewicz, G., filed Jan. 24, 2014.
Can, Fazli et al., "Dynamic Cluster Maintenance", Department of Systems Analysis, Kreger Hall, Miami University, Oxford, OH, IP & M, vol. 25, No. 3, 1989, pp. 275-291.
Yang, Yiming et al., "A Study on Retrospective and On-Lnie Event Detection", School of Computer Science, Carnegie Mellon University, Pittsburgh, PA 15213-3702; www.ca.cau.edu/yiming/, 1998, pp. 28-36.

\* cited by examiner

CLUSTERING USING LOCALITY-SENSITIVE HASHING WITH IMPROVED COST MODEL

CROSS-REFERENCE TO RELATED APPLICATIONS

This application is a divisional of U.S. patent application Ser. No. 14/163,555, entitled "CLUSTERING USING LOCALITY-SENSITIVE HASHING WITH IMPROVED COST MODEL," filed on Jan. 24, 2014, which is incorporated herein by reference in its entirety.

TECHNICAL FIELD

This patent application generally relates to clustering data, and more specifically, to using a locality sensitive hashing operation in a K-means clustering algorithm to improve the speed of the clustering and the quality of its output.

BACKGROUND

Data "clustering" involves grouping data in such a way that data in the same group ("cluster") are more similar across one or more attributes to each other than to those in other clusters. Data clustering is commonly used in in many fields, including image analysis, machine learning, pattern recognition, information retrieval, and bioinformatics. Data clustering can be performed using various clustering methods of computation, including "K-means" clustering.

K-means clustering partitions a dataset of observations into K clusters in which each observation belongs to the cluster with the nearest mean, which serves as a prototype or "centroid" of the cluster. The observations may be represented using high-dimensional data vectors. As one example in the field of image recognition, the dataset may comprise a number of images of various apparel, e.g., jackets, with each data point in the dataset being a 64×64 grayscale pixel image. K-means clustering algorithm can be used to find groups of images that represent similar-looking jackets.

FIG. 1 is a flow diagram illustrating a typical K-means clustering routine 100. At block 105, given a dataset of N data vectors and a specific value K, the routine 100 may randomly classify the N data vectors into K initial clusters. At block 110, the system computes the centroids of the K clusters. Though referred to as a "centroid", one with ordinary skill in the art will recognize that the terms "average", "mean", or "Nth-moment" are equivalent. At block 115, the routine 100 determines K new clusters by associating each data vector with a nearest centroid. Various measures can be used to represent the distance between a data vector and a centroid, e.g., the Euclidian distance or the cosine distance. At decision block 120, the routine 100 determines if an appropriate end condition has been reached. For example, the routine 100 may stop after a predetermined number of iterations, or when each successive centroid is less than a threshold distance from its predecessor in the previous iteration. If the end condition has not been reached, the routine 100 proceeds to another iteration returning to block 110, where the centroids of the K new clusters are determined.

Although K-means clustering produces good results for clustering, applying it can be computationally difficult because its computation is said to be "NP-complete."

BASIC DESCRIPTION OF THE DRAWINGS

The techniques introduced here may be better understood by referring to the following Detailed Description in conjunction with the accompanying drawings, in which like reference numerals indicate identical or functionally similar elements:

Figure 1:
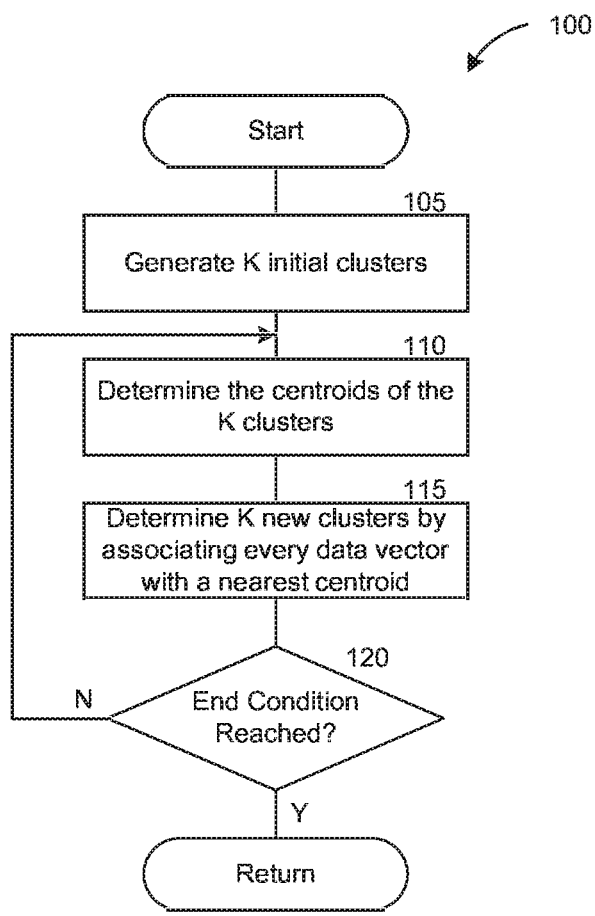
FIG. 1 is a flow diagram illustrating an example K-Means algorithm.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Embodiments are disclosed for using an improved LSH operation to reduce the computational complexity of K-means clustering. In various embodiments, parameters of an LSH operation are optimized with respect to a new cost model. In various embodiments, an LSH function is applied with optimized parameters for K-means clustering.

The disclosed embodiments provide a cost model for an LSH operation that accurately captures the computational cost of the LSH operation and an approach of setting the parameters of the LSH operation to reduce the computational cost. The disclosed embodiments can also apply the resulting LSH operation to a K-means clustering to approximate the clustering results with high quality and efficiency.

Because K-means clustering computations are complex, an LSH operation can be added to find data points that are proximate (e.g., close) to one another and thereby simultaneously reduce computational complexity and increase performance.

LSH involves reducing high-dimensional data by hashing N input items into M buckets so that nearby items are mapped to the same buckets with high probability, where M is much less than N. This is different from conventional hashing functions that attempt to avoid collisions.

As an example, given a collection of data points (e.g., a dataset), the LSH operation hashes the data points into a number of buckets such that those data points that are closer to one another are more likely to fall in the same bucket. Therefore, for a specific data point, all the other data points that are hashed into the same bucket are very likely to be close to the specific data point.

Figure 2:
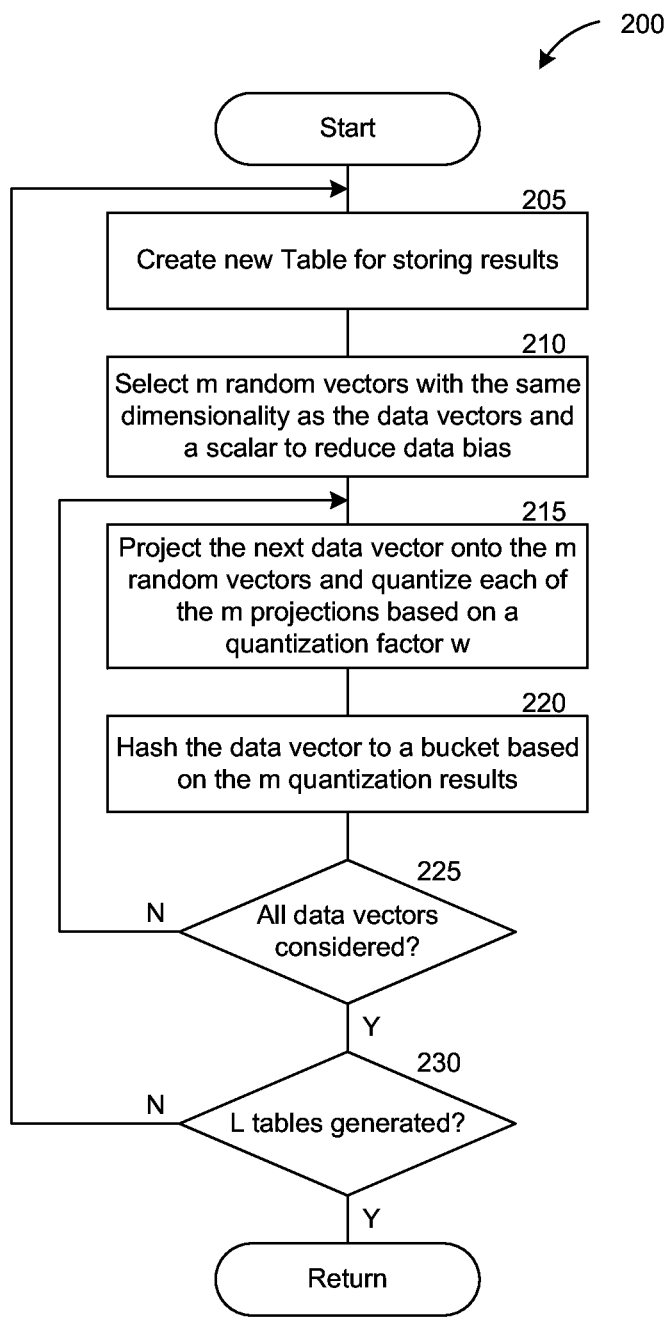
FIG. 2 is a flow diagram illustrating an example locally sensitive hashing ("LSH") operation.
Figure 3:
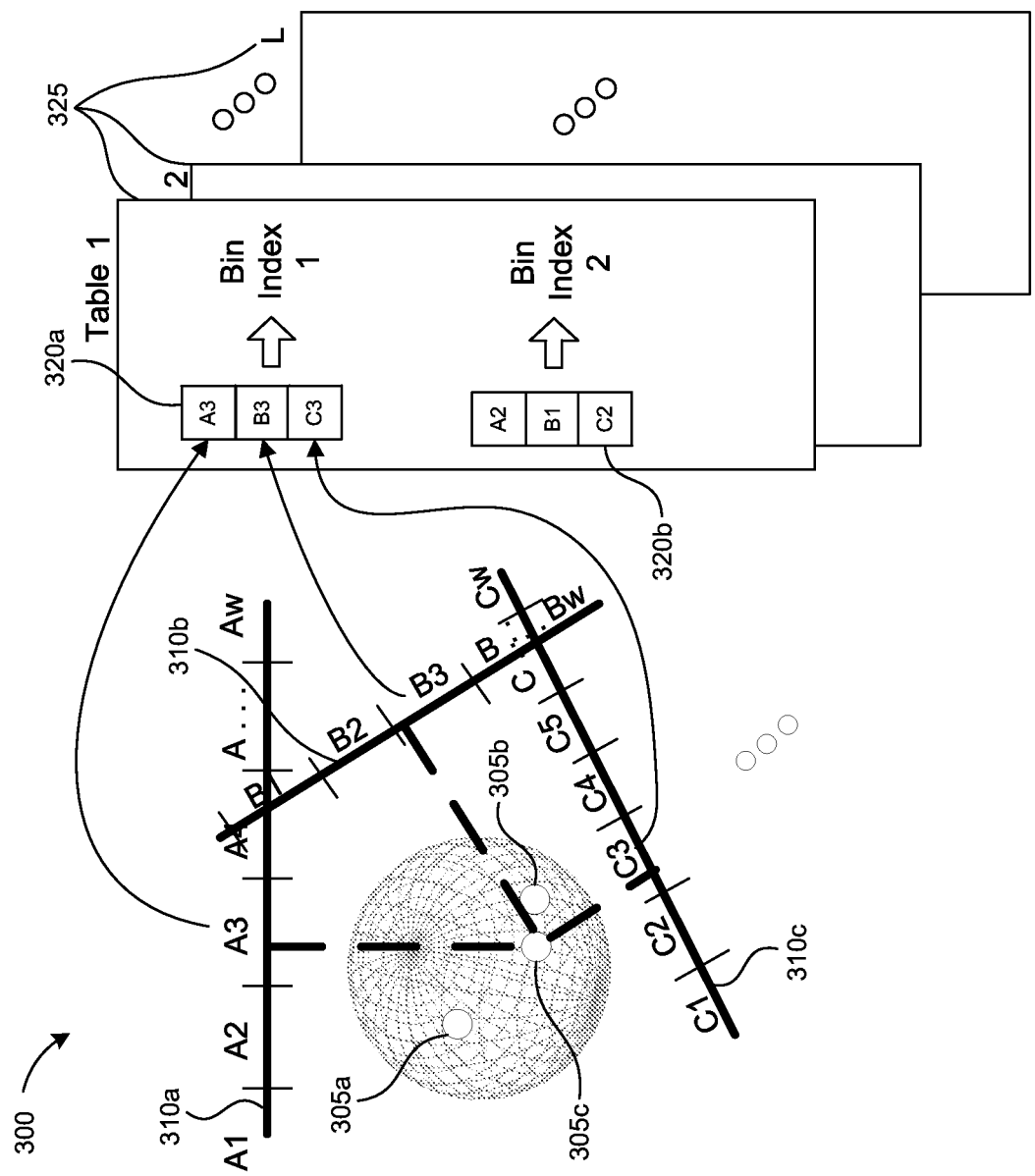
FIG. 3 is a data flow diagram illustrating the example LSH operation.

The LSH operation generally has three parameters: w, the quantization factor; m, the number of projections; and L, the number of repetitions. FIG. 2 contains a flowchart illustrating a typical LSH operation 200, and FIG. 3 contains a diagram illustrating the typical LSH operation graphically. At block 205, given a dataset of H data vectors, a system implementing the LSH operation may create a new hash table, such as one of the tables 325. At block 210, the system may generate m random vectors with the same dimensionality as the data vectors for projection purposes and, optionally, with a scalar term to reduce bias. Each coordinate of each of the m random vectors may be a Gaussian random variable N(0, 1), such as the vectors 310a-c. In some embodiments, a uniform, rather than a Gaussian random variable, may be used without bias.

At block 215, the system may select the next data vector, project it upon each of the m random vectors, and quantize each projection based on a quantization factor w. For example, the data point 305c may be projected onto the random vectors 310a-c, and the quantization results may respectively be A3, B3 and C3. The data point 305b is close to the data point 305c and thus may lead to the same quantization results. However, the data point 305a is away from the data points 305b and 305c, and thus the quantization results may respectively be A2, B1 and C2 instead. At block 220, the system may place the data vector in the bucket that corresponds to the m projections and also reduce the index of the m-dimensional bucket into a one-dimensional index. In that way, the number of buckets would correspond to the number of unique sets of m projections. In the example, the data points 305a and 305c would be placed in the bins 320b and 320a, respectively.

If not all the data vectors have been processed, then at block 225, the system may repeat the operations for the next data vector. If all the data vectors have been considered, the system may proceed to block 230. If at block 230 the desired number of hash tables (i.e., L) has been generated, the process may end. Conversely, if additional tables are to be generated, the process may repeat from block 205 such that a new collection of hashes are generated for a new table.

Generally, given a dataset and a query point, the LSH operation is applied to find the data points in the dataset that are close to the query data point by searching all the data points that are in the union of the L buckets to which the query point has been hashed. By virtue of the features described above, especially with m projections and L hash tables, extensive classifications may be performed with randomized hashes across successive tables to achieve a more accurate, aggregate categorization of the data vectors than would be achieved with a single projection by a single table.

In order to carry out the LSH operation, it is first necessary to set the three parameters. Typically, the setting of the parameters is formulated as an optimization problem: Given a cost model which indicates a computational cost associated with the LSH operation and an error probability which indicates a likelihood of incorrect hashing such that a query point is not hashed to the same bucket as its nearest data point, find the values for the parameters that would minimize the value of the cost model while guaranteeing that the probability of a hashing error would be below the error probability. There is significant prior art on how to define the cost model and how to set the parameters, but there is no definitive answer to these questions.

It would be helpful to work with a cost model that accurately captures the computational cost of a LSH operation, to optimally set the three parameters for the LSH operation, and to apply the resulting LSH operation to a K-means clustering algorithm to approximate the clustering results with high quality and efficiency.

Various examples of the techniques introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

In the embodiments, a computer system may be used to implement various features. Details of the computer system are discussed in detail below. Initially, a new cost model for the LSH operation is proposed. It characterizes the cost of hashing a query vector using the LSH operation as well as the cost of searching other data vectors in the union of buckets to which the query vector has been hashed for the nearest to the query vector. Specifically, when searching for a nearest point for a query vector, it takes time proportional to m to hash the query vector into one of the w buckets, each containing a subset of the data vectors, for each of the L functions. It also takes time to compute the cross-distance product between the query vector and every data vector in the union of the L buckets to which the query vector has been hashed. The system defines the new cost model for the LSH operation as follows:

$$L*m + \text{expCrossProdBucketUnion}(w, m, L)) \quad (1)$$

where expCrossProdBucketUnion(w, m, L) gives the expected number of cross products to be computed for the data vectors in the union of the buckets to which the query vector has been hashed. In some embodiments, expCrossProdBucket(w, m, L) can be empirically estimated by sampling, as discussed in detail below.

Figure 4:
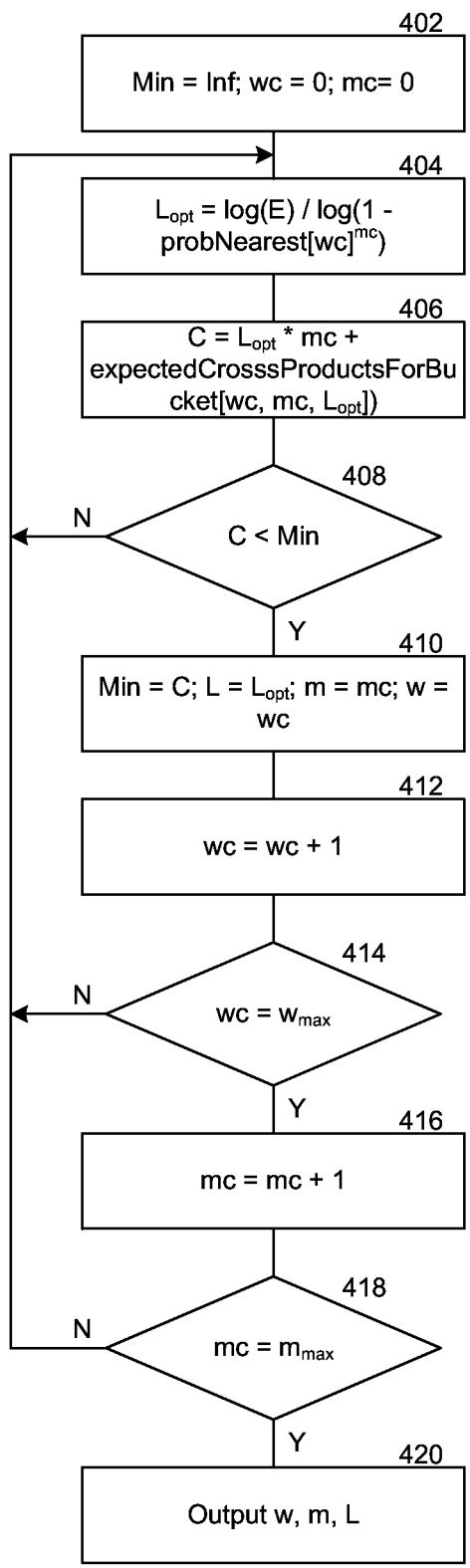
FIG. 4 is a flow diagram illustrating an example process of setting parameters.

Given this new cost model and an error probability of E, the system may set the parameters for the LSH operation as follows. FIG. 4 is a flowchart illustrating an example process of setting the parameters. In one embodiment, the system searches in the space of all possible values of w and m, and for each pair of values, finds the corresponding value of L such that the triple of values minimizes the value of the new cost model while guaranteeing that the probability of a hashing error would be below E. At block 402, the system initializes the variables in preparation for the search. At block 404, for given values wc of w and mc of m, the system computes a value $L_{opt}$ of L, that guarantees that the probability of a hashing error would be below the error probability E. Given w, m, and L, the system computes the probability of a hashing error as follows:

$$1 - (1 - \text{probNearest}(w)^m)^L \quad (2)$$

where probNearest(wc) (which is an example of a "hit probability") is the probability that a random query vector and its nearest neighbor falls into the same bucket with a quantization factor of wc, one random projection and one repetition. In one embodiment, probNearest(wc) can be empirically estimated by sampling. For example, as the LSH operation is to be applied in each iteration of the K-means clustering algorithm, the system may use the K current centroids as the potential nearest neighbors, generate one random vector for the projection, and randomly choose some of the query vectors. For each of the chosen query vectors, the system may determine whether the query vector and the centroid of the cluster to which it currently belongs would be hashed to the same bucket through projection and quantization. Therefore, the system computes $L_{opt}$ as follows:

$$L_{opt} = \log(E)/\log(1-\text{probNearest}(wc)\hat{\ }mc) \qquad (3)$$

At block 406, the system computes the value C of the new cost model for the current (wc, mc, $L_{opt}$) according to formula 1. As discussed above, in one embodiment, expCrossProdBucket(wc, mc, $L_{opt}$) can be empirically estimated by sampling. For example, the system may again use the K current centroids as the potential nearest neighbors, generate m random vectors for the projection, and randomly choose some of the query vectors. For each of the chosen query vectors, the system may determine the number of centroids that would be hashed in the bucket to which the query vector has been hashed through projection and quantization. It is possible to distribute the computation, specifically of expCrossProdBucket(wc, mc, $L_{opt}$), which can involve sampling of the query vectors, into separate computations, each involving sampling a distinct set of the query vectors. The results of the separate computations for every possible wc and mc (and the corresponding $L_{opt}$) would be aggregated to ultimately determine the value of expCrossProdBucket(wc, mc, $L_{opt}$). The system may carry out the separate computations with multiple processors simultaneously for increased performance. Furthermore, it may adjust the amount of computation assigned to each of these processors to achieve optimal load balancing.

At step 408, it determines whether the cost C is less than the current minimum value Min. If the determination outcome is positive, at block 410, the system records (wc, mc, $L_{opt}$) and updates Min to be the cost C. At blocks 412 through 418, the system moves on to the rest of the search space until the search is complete. In one embodiment, $w_{max}$ is 255, and $m_{max}$ is a number that results in one data vector in each bucket on average. At block 420, the system outputs w, m and L, which have been set to the optimal values.

Using the LSH operation, the system may implement the K-means clustering algorithm to cluster N query vectors into K clusters as follows. It may use the LSH operation in an attempt to quickly find the closest centroid for each query vector by running the LSH operation on the query vectors and the centroids and limiting the scope of the search for each query vector to those centroids in the union of the buckets to which the query vector has been hashed.

Figure 5:
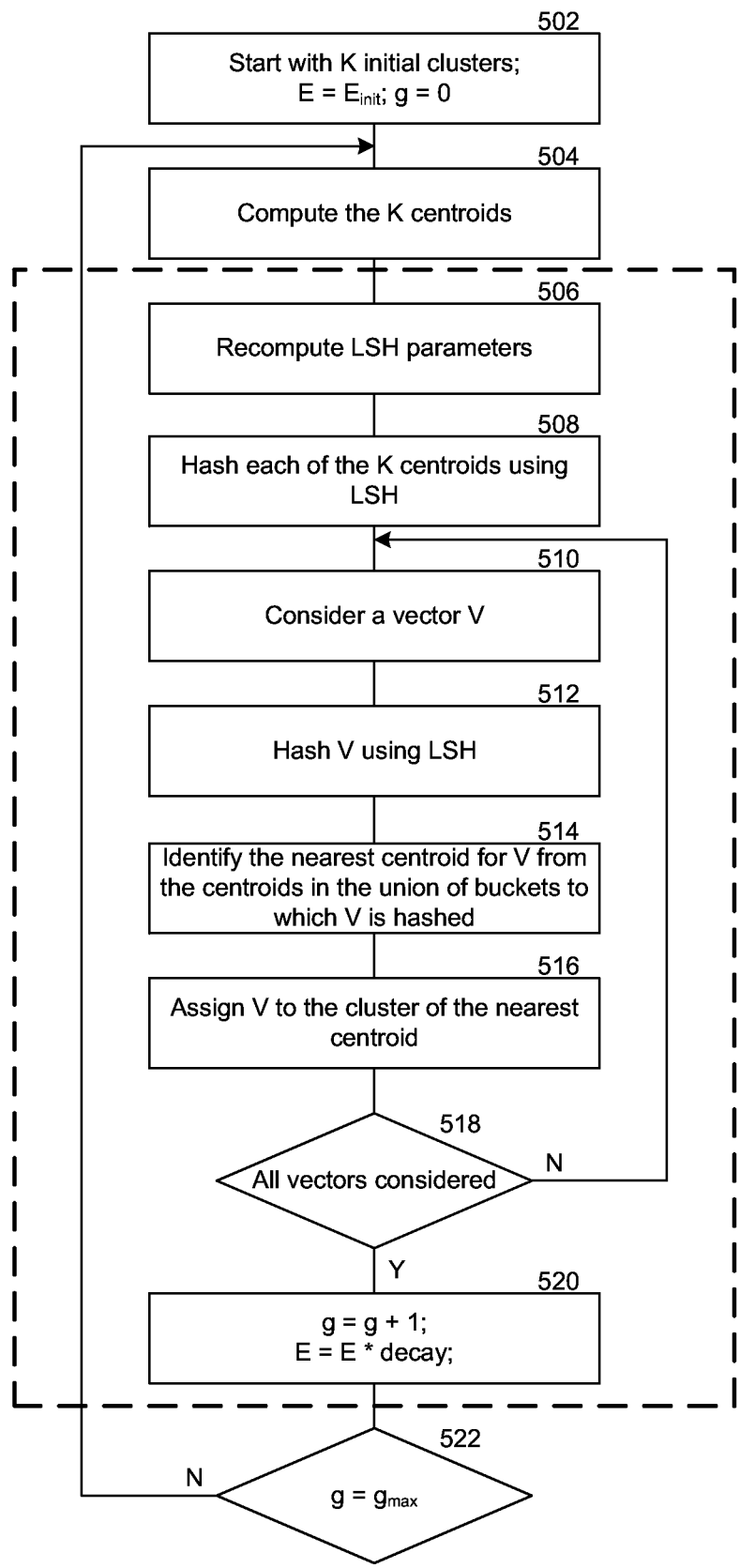
FIG. 5 is a flow diagram illustrating an example process of a K-means clustering algorithm.

FIG. 5 is a flow diagram illustrating an example process of such K-means clustering algorithms. At step 502, the system initializes the variables, including the error probability for the LSH operation. The initial value can be 0.95, for example. The system also sets up K initial clusters, such as by randomly distributing the N query vectors into K groups. At block 504, the system computes the centroid of each of the K clusters at the beginning of an iteration.

Blocks 506-520 then correspond to block 115 in FIG. 1. At block 506, the system re-computes the parameters of the LSH operation, as described in FIG. 4. This re-computation may reduce the chance of accumulating classification errors over multiple iterations of the K-means clustering algorithm due to the imprecise nature of the LSH operation. At block 508, the system hashes each of the K centroids using the LSH operation with the re-computed parameters.

At blocks 510-518, the system considers each of the query vectors for reassignment into a different cluster. At block 512, it hashes the current query vector using the LSH operation with the re-computed parameters. At block 514, it identifies the union of buckets to which the current query vector is hashed, computes the distance between the current query vector and each of the centroids in the union of the buckets, and determines the centroid corresponding to the shortest distance. It is possible that the union of buckets is empty. In that case, the system performs an exhaustive search of all the centroids for the one nearest to the current query vector.

At block 516, the system generally assigns the current query vector to the cluster with the centroid corresponding to the shortest distance. However, due to the imprecise nature of the LSH operation, it is possible that the set of centroids in the union of the buckets does not include the centroid that is nearest the current query vector in reality. Therefore, the system may perform tests to ensure that the centroid corresponding to the shortest distance that it has computed is at least reasonably close to the current query vector. One test the system may perform is to compare the computed shortest distance with a certain threshold, such as the 99th percentile of the distribution of the distance to a centroid, which may be pre-computed by sampling. If the computed shortest distance is no less than the 99th percentile, the system may perform an exhaustive search of all the centroids for the nearest one. Another test the system may perform is to compare the computed shortest distance d_c with the computed shortest distance in the previous iteration d_p1. To perform this comparison, the system would save the computed shortest distance in each iteration for use in the next iteration or re-compute the distance in the next iteration. If d_c is no less than the d_p1, the system may skip the block of assigning the current query vector to a new cluster. A similar test would be to compare d_c with the distance to the centroid corresponding to the shortest distance computed in the previous iteration d_p2. For this comparison, the system would record the centroid corresponding to the shortest distance computed in each iteration for use in the next iteration. If d_c is no less than d_p2, the system may skip the block of assigning the current query vector to a new cluster.

At block 518, when all the query vectors have been considered for reassignment (and one or more have been reassigned as a result), the system gets ready to move on to the next iteration at block 520, including shrinking the error probability. The value of the decay can be 0.6, for example. If a termination condition is reached at block 522, however, the process ends.

Figure 6:
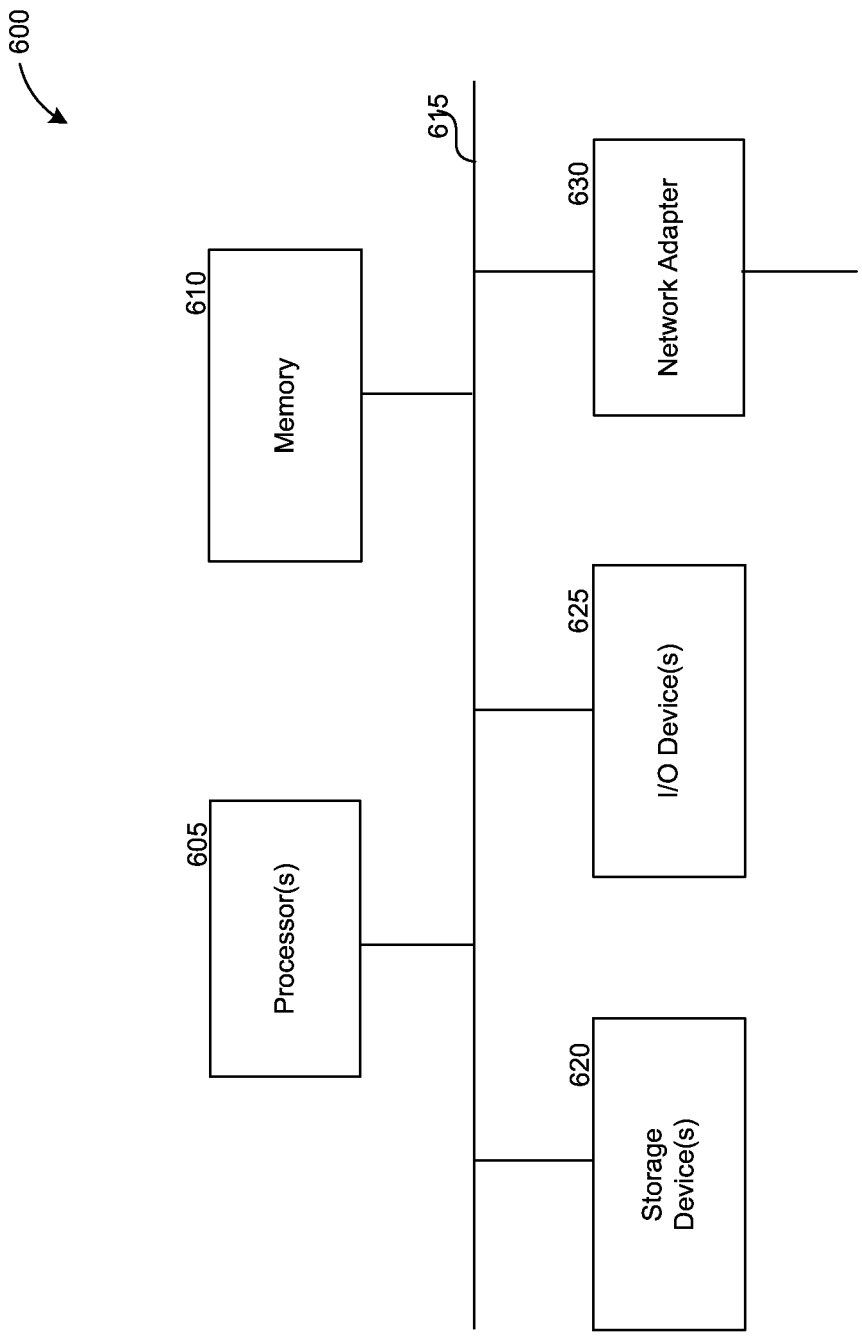
FIG. 6 is a block diagram illustrating example components of a computer system that may be used to implement various features of the disclosed embodiments.

FIG. 6 is a block diagram illustrating example components of a computer system that may be used to implement various features of the embodiments. The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example, by using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage," and that the terms may on occasion be used interchangeably.

Consequently, alternative language and synonyms may be used for any one or more of the terms discussed herein nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method comprising:
    setting parameters for executing a locality-sensitive hashing (LSH) operation over a set of query vectors and a set of data vectors, wherein:
    the LSH operation is parameterized by a number of projections, a quantization factor and a number of repetitions and hashes a vector to a collection of buckets; and
    setting the parameters comprises,
    iterating over candidate values for the number of projections and the quantization factor;
    computing, while iterating over the candidate values, a hit probability that a query vector and its nearest data vector hash to the same bucket when the LSH operation is run with one projection and one repetition;
    computing, while iterating over the candidate values, a value for the number of repetitions that limits a classification error associated with executing the LSH operation to a predetermined error probability based on the hit probability;
    computing, while iterating over the candidate values, a value of a computational cost associated with executing the LSH operation on the query vector and the set of data vectors; and
    selecting optimized values for the quantization factor, the number of projections and the number of repetitions that minimize the value of the computational cost; and
    clustering data by executing the LSH operation one or more times using the optimized values for the quantization factor, the number of projections and the number of repetitions.

2. The computer-implemented method of claim 1, wherein the number of projections ranges from one to a number that results in one data vector in each bucket on average.

3. The computer-implemented method of claim 1, wherein clustering data comprises:
    clustering the set of query vectors into K clusters using the LSH operation by:
    grouping the set of query vectors into K clusters, and iterating the following steps until a termination condition is reached:
computing centroids of the K clusters, and
assigning each of the query vectors to one of the K clusters with a nearest centroid by executing the LSH operation over the query vector and the set of K centroids.

4. The computer-implemented method of claim 3, further comprising:
re-computing the parameters for executing the LSH operation over the set of query vectors and the set of K centroids before executing the LSH operation in each iteration,
wherein the LSH operation is then executed with the re-computed parameters.

5. The computer-implemented method of claim 3, further comprising the step of reducing an upper bound for a classification error associated with executing the LSH operation in each iteration.

6. The computer-implemented method of claim 3, wherein the assigning comprises:
hashing each of the K centroids using the LSH operation; and
for each of the query vectors:
hashing the query vector using the LSH operation into a collection of buckets;
identifying the nearest centroid in the union of the buckets to which the query vector is hashed; and
assigning the query vector to the cluster with the nearest centroid.

7. The computer-implemented method of claim 6, wherein the identifying includes computing a distance between the query vector and every centroid in the union of the buckets.

8. The computer-implemented method of claim 3, wherein computing the hit probability comprises:
hashing each of the K centroids and each of a random subset of the set of query vectors using the LSH operation with one projection, the current value of the quantization factor and one repetition; and
determining a percentage of the query vectors in the random subset, each of which is hashed to the same bucket as the centroid of the cluster to which the query vector currently belongs.

9. The computer-implemented method of claim 8, wherein the value of the computational cost is computed by:
computing a first computational cost of hashing the query data vector into a collection of buckets based on the number of projections;
computing a second computational cost of searching the set of data vectors in the union of the buckets based on the number of repetitions; and
determining a sum of the first computational cost and the second computational cost.

10. The computer-implemented method of claim 9, wherein the second computational cost is proportional to an expected number of the set of data vectors that are hashed to a bucket to which the query vector is hashed, and computing the expected number includes:
hashing each of the K centroids and each of a random subset of the set of query vectors using the LSH operation with the current values of the number of projections, the quantization factor, and the number of repetitions; and
determining the average number of the centroids hashed to the same bucket as one of the query vectors in the random subset.

11. The computer-implemented method of claim 10, wherein:
the hashing is performed by a number of processors, each performance involving a distinct subset of the set of query vectors, and
the determining is performed over the union of the distinct subsets of the set of query vectors.

12. A computer-readable storage device storing computer-executable instructions that, when executed by at least one processor of a computing device, cause the computing device to:
set parameters for executing a locality-sensitive hashing (LSH) operation over a set of query vectors and a set of data vectors, wherein:
the LSH operation is parameterized by a number of projections, a quantization factor and a number of repetitions and hashes a vector to a collection of buckets; and
setting the parameters comprises, while iterating over candidate values of the number of projections and the quantization factor;
computing a first computational cost of hashing the query vector into a collection of buckets based on the number of projections;
computing a second computational cost of searching the data vectors in the union of the buckets based on the number of repetitions; and
selecting optimized values of the quantization factor, the number of projections and the number of repetitions that minimize a sum of the first computational cost and the second computational cost; and
clustering data by executing the LSH operation one or more times using the optimized values of the quantization factor, the number of projections and the number of repetitions.

13. The computer-readable storage device of claim 12, wherein:
the first computational cost is proportional to a product of the number of projections and the number of repetitions, and
the second computational cost is proportional to an expected number of the data vectors that are hashed to a bucket to which the query vector is hashed.

14. The computer-readable storage device of claim 12, wherein clustering data comprises
clustering the set of query vectors into K clusters using the LSH operation by:
grouping the set of query vectors into K clusters, and
iterating the following steps until a termination condition is reached:
computing centroids of the K clusters, and
assigning each of the query vectors to one of the K clusters with a nearest centroid by executing the LSH operation over the query vector and the set of K centroids.

15. The computer-readable storage device of claim 14, wherein the expected number is computed by:
hashing each of the K centroids and each of a random subset of the set of query vectors using the LSH operation with the current values of the number of projections, the quantization factor, and the number of repetitions; and
determining the average number of the centroids hashed to the same bucket as one of the query vectors in the random subset.

16. The computer-readable storage device of claim 14, wherein the assigning comprises:

hashing each of the K centroids using the LSH operation; and for each of the query vectors:
  hashing the query vector using the LSH operation into a collection of buckets;
  identifying the nearest centroid in the union of the buckets to which the query vector is hashed; and
  assigning the query vector to the cluster with the nearest centroid.

17. The computer-readable storage device of claim 12, wherein the number of projections ranges from one to a number that results in one data vector in each bucket on average.

18. A system comprising:
  a component configured to cluster data by executing a locality sensitive hashing (LSH) operation over a set of query vectors and a set of data vectors, wherein the LSH operation is parameterized by a number of projections, a quantization factor and a number of repetitions and hashes a vector to a collection of buckets; and
  a component configured to:
  iterate over candidate values of the number of projections and the quantization factor;
  compute a hit probability that a query vector and its nearest data vector hash to the same bucket when the LSH operation is run with one projection and one repetition;
  compute a value of the number of repetitions that limits a classification error associated with executing the LSH operation to a predetermined error probability based on the hit probability;
  compute a value of a computational cost associated with executing the LSH operation on the query vector and the set of data vectors; and
  selecting optimized values of the quantization factor, the number of projections and the number of repetitions that minimize the value of the computational cost, and
  wherein the LSH operation is executed one or more times using the optimized values of the quantization factor, the number of projections and the number of repetitions.

19. The system of claim 18, wherein the component configured to cluster data clusters:
  the set of query vectors into K clusters using the LSH operation by:
    grouping the set of query vectors into K clusters, and
    iterating the following steps until a termination condition is reached:
      computing centroids of the K clusters, and
      assigning each of the query vectors to one of the K clusters with a nearest centroid by executing the LSH operation over the query vector and the set of K centroids.

20. The system of claim 19, wherein the query vectors are assigned by:
  hashing each of the K centroids using the LSH operation; and
  for each of the query vectors:
    hashing the query vector using the LSH operation into a collection of buckets;
    identifying the nearest centroid in the union of the buckets to which the query vector is hashed; and
    assigning the query vector to the cluster with the nearest centroid.

* * * * *